US011740636B2

(12) United States Patent
Cardei

(10) Patent No.: US 11,740,636 B2
(45) Date of Patent: Aug. 29, 2023

(54) AUTONOMOUS VEHICLE HAVING A THERMAL INFRARED CAMERA WITH REPLACEABLE FILTER

(71) Applicant: Waymo LLC, Mountain View, CA (US)

(72) Inventor: Vlad Constantin Cardei, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 194 days.

(21) Appl. No.: 16/928,538

(22) Filed: Jul. 14, 2020

(65) Prior Publication Data

US 2021/0018925 A1 Jan. 21, 2021

Related U.S. Application Data

(60) Provisional application No. 62/875,228, filed on Jul. 17, 2019.

(51) Int. Cl.
*G05D 1/02* (2020.01)
*G05D 1/00* (2006.01)

(52) U.S. Cl.
CPC ......... *G05D 1/0231* (2013.01); *G05D 1/0033* (2013.01)

(58) Field of Classification Search
CPC .. G05D 1/0231; G05D 1/0033; H04N 17/002; H04N 5/33; H04N 5/2252; B60J 1/02; B60K 2370/797; B60Q 5/005; B60R 2300/108; G01J 5/08; G02B 27/0006; G03B 2217/002
See application file for complete search history.

(56) References Cited

U.S. PATENT DOCUMENTS

| 5,183,602 | A  | * | 2/1993 | Raj ......................... G02B 5/22 |
|           |    |   |        | 252/588 |
| 9,304,377 | B2 | * | 4/2016 | Eineren .................... H04N 5/33 |
| 9,718,405 | B1 |   | 8/2017 | Englander et al. |
| | | | (Continued) | |

FOREIGN PATENT DOCUMENTS

JP 2005301173 A * 10/2005

OTHER PUBLICATIONS edmundoptics.com [online], "The Correct Material for Infrared (IR) Applications", available on or before Feb. 9, 2016, URL < https://www.edmundoptics.com/knowledge-center/application-notes/optics/the-correct-material-for-infrared-applications/>, 5 pages (Year: 2016).*

(Continued)

*Primary Examiner* — Jonathan L Sample
*Assistant Examiner* — Elizabeth Rose Neleski
(74) *Attorney, Agent, or Firm* — Fish & Richardson P.C.

(57) ABSTRACT

Methods, systems, and apparatus, for an autonomous vehicle navigation maintenance system. In one aspect, an autonomous vehicle monitoring system includes a mounting surface located on an autonomous vehicle, and a thermal imaging system affixed to the mounting surface, the thermal imaging system including a thermal imaging camera, a replaceable filter, and a filter fixture configured to affix the replaceable filter to the thermal imaging camera and aligned with an optical axis of the thermal imaging camera, and where maintenance of the replaceable filter does not include re-calibrating the thermal imaging camera.

19 Claims, 5 Drawing Sheets

(56) References Cited

U.S. PATENT DOCUMENTS

| | | | |
|---|---|---|---|
| 10,175,112 B1 | | 1/2019 | Kuperman et al. |
| 11,144,056 B1 | * | 10/2021 | Ebrahimi Afrouzi ..... B65F 3/00 |
| 2007/0216768 A1 | | 9/2007 | Smith et al. |
| 2018/0335380 A1 | * | 11/2018 | Schmidt ............. G01N 21/3504 |
| 2019/0092287 A1 | * | 3/2019 | Leach ....................... B60S 1/56 |

OTHER PUBLICATIONS

Corso, "Geometric Camera Calibration," retrieved from URL <https://web.eecs.umich.edu/~jjcorso/t/598F14/files/lecture_0917_calibration.pdf>, Sep. 2014, 76 pages.

edmundoptics.com [online], "The Correct Material for Infrared (IR) Applications," available on or before Jun. 14, 2020, via Internet Archive: Wayback Machine URL <https://web.archive.org/web/20200614182959/https://www.edmundoptics.com/knowledge-center/application-notes/optics/the-correct-material-for-infrared-applications/, retrieved on Jul. 9, 2020, URL < https://www.edmundoptics.com/knowledge-center/application-notes/optics/the-correct-material-for-infrared-applications/>, 4 pages.

flir.com [online], "FLIR ADK," available on or before Apr. 11, 2019, via Internet Archive: Wayback Machine URL <https://web.archive.org/web/20190411110838/https://www.flir.com/products/adk/>, retrieved on Jul. 7, 2020, URL <https://www.flir.com/products/adk/>, 3 pages.

Nardi, "Adding Optics to a Consumer Thermal Camera," retrieved from URL <https://hackaday.com/2018/03/08/adding-optics-to-a-consumer-thermal-camera/>, Mar. 2018, 2 pages.

Prutchi, "Thermal Camera diy Macro and Telephoto Converters," retrieved from URL <http://uvirimaging.com/2018/03/05/thermal-camera-diy-macro-and-telephoto-converters/>, Mar. 2018, 8 pages.

shop.usa.canon.com [online], "Lens Filters," retrieved from URL <https://shop.usa.canon.com/shop/en/catalog/search/lens-filters#facet:&productBeginIndex:0&orderBy:&pageView:grid&pageSize:72&>, retrieved on Jul. 14, 2020, 7 pages.

* cited by examiner

AUTONOMOUS VEHICLE HAVING A THERMAL INFRARED CAMERA WITH REPLACEABLE FILTER

CROSS-REFERENCE TO RELATED APPLICATIONS

This application claims the benefit under 35 U.S.C. § 119(e) of priority to U.S. Application Ser. No. 62/875,228, filed on Jul. 17, 2019, the contents of which are incorporated by reference.

BACKGROUND

This specification relates to autonomous vehicle sensing and navigation systems. Vehicles can be configured to operate in an autonomous or semi-autonomous modes in which the vehicles can navigate through an environment with little or no input from a human driver. The autonomous vehicles can include an array of sensors that are each configured to collect information about the environment surrounding the vehicle and assist the autonomous vehicle in making operating decisions.

SUMMARY

This specification describes technologies relating to autonomous vehicle navigation systems including thermal cameras.

In general, one innovative aspect of the subject matter described in this specification can be embodied in an autonomous vehicle monitoring system including a mounting surface located on an autonomous vehicle, a thermal imaging system affixed to the mounting surface, the thermal imaging system including a thermal imaging camera, a replaceable filter, and a filter fixture configured to affix the replaceable filter to the thermal imaging camera and aligned with an optical axis of the thermal imaging camera, and a camera control unit configured to maintain an image quality for imaging data collected by the thermal imaging system above a threshold image quality. Maintaining the image quality includes calibrating a thermal imaging camera including a replaceable filter, where a calibration process includes a threshold image quality for imaging data captured by the thermal imaging camera, receiving, from the thermal imaging camera, thermal imaging data, determining, by a camera control unit, that an image quality for the thermal imaging data captured by the thermal imaging camera on the autonomous vehicle including the replaceable filter is below a threshold image quality, determining, by the camera control unit, that the replaceable filter for the thermal imaging camera is a source of the image quality that is below the threshold image quality, and in response, triggering a maintenance request for the replaceable filter of the thermal imaging camera on the autonomous vehicle. The maintenance request of the replaceable filter does not include re-calibrating the thermal imaging camera.

Other embodiments of this aspect include corresponding methods and computer programs, configured to perform the actions of the methods, encoded on computer storage devices.

These and other embodiments can each optionally include one or more of the following features. In some implementations, the thermal imaging camera includes a thermal imaging sensor and an imaging lens aligned with the thermal imaging sensor and configured to focus infrared light on an imaging plane of the thermal imaging sensor.

In some implementations, replacing the replaceable filter includes not re-calibrating the thermal imaging camera. The replaceable filter can include a single-crystalline germanium material, and can be coated on a surface with diamond particles.

In some implementations, the system further including a rinsing apparatus mounted on the autonomous vehicle and configured to spray a surface of the replaceable filter with a cleaning liquid.

In some implementations, the thermal imaging camera is configured to capture imaging data in the 7-14 micron wavelength range. The replaceable filter can be configured to allow a substantial percentage of light having wavelengths in the thermal infrared wavelength range, e.g., 7 to 14 microns, to pass through while substantially filtering wavelengths outside the thermal infrared wavelength range, e.g., 7 to 14 microns.

In some implementations, the filter fixture is a threaded barrel mount. The replaceable filter can be affixed to the filter fixture by a clip filter mount or threaded filter mount.

In general, another innovative aspect of the subject matter described in this specification can be embodied in methods for maintaining a thermal imaging camera on an autonomous vehicle including calibrating a thermal imaging camera including a replaceable filter, where a calibration process includes a threshold image quality for imaging data captured by the thermal imaging camera, receiving, from the thermal imaging camera, thermal imaging data, determining, by a camera control unit, that an image quality for the thermal imaging data captured by the thermal imaging camera on the autonomous vehicle including the replaceable filter is below a threshold image quality, determining, by the camera control unit, that the replaceable filter for the thermal imaging camera is a source of the image quality that is below the threshold image quality, in response, triggering a maintenance request for the replaceable filter of the thermal imaging camera on the autonomous vehicle. The maintenance request of the replaceable filter does not include re-calibrating the thermal imaging camera.

These and other embodiments can each include one or more of the following features. In some implementations, the maintenance request includes rinsing a surface of the replaceable filter with a cleaning liquid. In some implementations, the methods further include, determining that the image quality is below the threshold image quality after a completion of the maintenance request and in response, triggering a replacement notification.

In some implementations, the replacement notification includes replacing the replaceable filter and does not include re-calibrating the thermal imaging camera. The replacement notification can be provided to a user device and/or to an autonomous maintenance system.

In some implementations, determining that the image quality is below the threshold image quality includes applying one or more quality metrics to the thermal imaging data from the thermal imaging camera.

In general, another innovative aspect of the subject matter described in this specification can be embodied in autonomous vehicle monitoring system including a mounting surface located on an autonomous vehicle, and a thermal imaging system affixed to the mounting surface. The thermal imaging system includes a thermal imaging camera, a replaceable filter, and a filter fixture configured to affix the replaceable filter to the thermal imaging camera and aligned with an optical axis of the thermal imaging camera, and where maintenance of the replaceable filter does not include re-calibrating the thermal imaging camera.

These and other embodiments can each include one or more of the following features. In some implementations, maintenance of the replaceable filter includes removing the replaceable filter affixed by the filter fixture to the thermal imaging camera and attaching a new replaceable filter to the thermal imaging camera using the filter fixture.

Particular embodiments of the subject matter described in this specification can be implemented to realize one or more of the following advantages. For example, embodiments can feature autonomous vehicle sensing systems that can be efficiently and economically serviced. For instance, a replaceable filter that is transparent to the thermal infrared wavelengths can protect expensive fragile optical components of a thermal infrared imaging system from environmental damage, e.g., inclement weather, dust/dirt particles, scratches, etc. The replaceable filter can be replaced on the thermal infrared imaging system without requiring removal or replacement of the thermal infrared imaging system from an autonomous vehicle monitoring system, improving efficiency of maintenance, removing the need to re-calibrate the thermal infrared imaging system at each maintenance, and reducing costs of maintenance.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

The technology of this patent application is autonomous vehicle navigation maintenance system including a thermal imaging system.

More particularly, the technology incorporates a replaceable infrared filter affixed to a thermal imaging system on an autonomous vehicle, where the replaceable filter can be replaced during a maintenance procedure to preserve a threshold imaging quality for the thermal imaging system without requiring a re-calibration process of the thermal imaging system and without requiring replacing the entire thermal imaging system on the autonomous vehicle.

An autonomous vehicle can include a navigation system including one or more sensors, e.g., radio detection and ranging (RADAR), light detection and ranging (LIDAR), and thermal infrared imaging sensors among other possibilities, to facilitate navigation of the autonomous vehicle in an environment that includes other vehicles and/or obstacles along the path of the vehicle. The navigation system can be configured to monitor a surrounding environment of the autonomous vehicle before performing a maneuver, e.g., crossing an intersection, switching a lane, entering a parking lot, etc.

Figure 1:
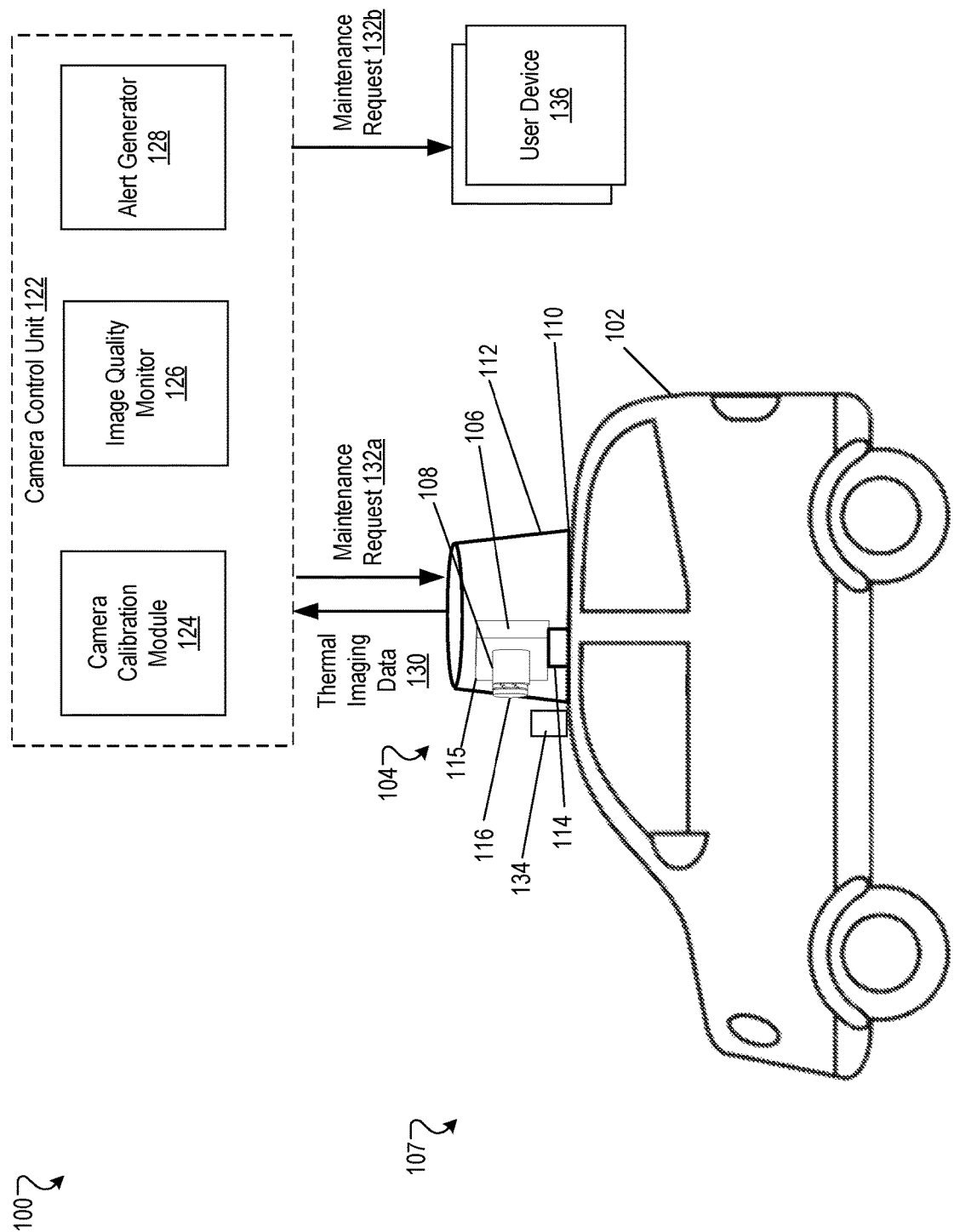
FIG. 1 is a block diagram of an example of an autonomous vehicle including a thermal imaging camera system.

Example Operating Environment of Autonomous Vehicle Navigation Maintenance System FIG. 1 is a block diagram of an example operating environment 100 for the autonomous vehicle navigation maintenance system. Autonomous vehicle 102 can be a commercial or non-commercial vehicle, for example, a car, a truck, a bus, a flatbed, a trailer truck, or another piece of heavy machinery that is operated on a roadway.

In one example, autonomous vehicle 102 can be a car. In another example, autonomous vehicle 102 can be a public transit vehicle, e.g., a bus. Though described with reference to FIG. 1 as an automotive vehicle, the term "vehicle" could also be any moving object including, for example, an aerial vehicle, watercraft, spacecraft, farm vehicle, a carrier that rides on a track such as a roller coaster, trolley, tram, or train car, among other examples.

Autonomous vehicle 102 includes a navigation system 104 that includes one or more sensor devices 106, e.g., LIDAR sensors, RADAR sensors, sonars, ultrasonic sensors, thermal imaging sensors, thermal imaging cameras, etc., for scanning an environment 107 surrounding the autonomous vehicle 102. Though described herein as an autonomous vehicle 102 including a navigation system 104, the system can be implemented in other forms, e.g., stationary autonomous systems, robotic systems, industrial systems, medical devices, mobile communications systems, or the like.

Autonomous vehicle 102 is described with reference to FIG. 1 as operating in an autonomous and/or semi-autonomous mode. However, autonomous vehicle 102 can optionally operate in a manual mode where the navigation system 104 can instead inform the operation of the vehicle by a human operator.

Navigation system 104 can include one or more sensor units 108, where each sensor unit 108 includes one or more sensor devices 106. Sensor unit 108 can be mounted, for example, on a top surface 110, e.g., a roof, of the autonomous vehicle 102, as depicted in FIG. 1. Alternatively, or additionally, sensor units 108 can be mounted on a bottom side of the vehicle, e.g., on a front or rear bumper, on a side of the vehicle, e.g., on a side-view mirror, on a wheel bed, or another attachment point on the vehicle. Each sensor unit 108 can include a particular set of sensors devices 106, e.g., a top surface sensor unit can include a LIDAR sensor and a thermal imaging sensor. In another example, a sensor unit 108 mounted on a rear bumper of the vehicle can include a RADAR sensor and an imaging camera, e.g., a back-up guidance camera. Though depicted in FIG. 1 as a single sensor unit, multiple sensor units can be mounted in different locations on the vehicle.

Sensor units 108 can include a protective housing 112, where at least a portion of the protective housing 112 can be transparent, e.g., have high transmissivity above ~95%, to wavelengths captured by the one or more sensor device 106 housed within the sensor units. In some implementations, protective housing 112 can have cut-out portions of the housing to expose the one or more sensor devices 106 to the environment, e.g., a cut-out to allow a camera lens to be exposed to the environment 107.

In some implementations, a sensor device 106 is a thermal imaging sensor that is configured to capture imaging data in the thermal infrared wavelength range, e.g., 7-14 micron wavelength range.

Sensor devices, e.g., thermal imaging sensor, can be mounted on a movable mount 114 on which the sensor device 106 can be movably mounted. The movable mount can include, for example, a rotating platform, a tip/tilt stage, or another adjustable mounting platform. Sensor devices 106 mounted on the movable mount 114 can be rotated such that the sensors can obtain information about the environment 107, e.g., thermal imaging data, from various directions around the autonomous vehicle 102. The moveable mounts 114 can include one or more actuators and control systems to automatically and/or semi-automatically adjust an orientation of the sensor device, e.g., tip the camera at a particular angle/azimuth such that a field of view of the camera captures a particular range of angles. Actuators can be, for example, motors, pneumatic actuators, hydraulic pistons, relays, solenoids, piezoelectric actuators, or the like.

In some implementations, the moveable mount 114 is configured to adjust an orientation of the sensor device 106 to calibrate operation of the sensor device 106, e.g., calibrate operation of thermal imaging camera. Details of the calibration of the sensor are described in further detail below.

In some implementations, sensor device 106 is a thermal imaging camera, where the thermal imaging camera is a component of a thermal imaging system 115 that additionally includes a replaceable filter 116. Replaceable filter 116 can be formed from any material that is substantially transparent to light having wavelengths within a wavelength range, and that is substantially opaque to light having wavelengths outside the wavelength range. Replaceable filter 116 can also be referred to as a replaceable lens filter. In one example, the replaceable filter 116 can allow light having a wavelengths in the thermal infrared wavelength range, e.g., 7 microns to 14 microns, to pass through at an efficiency greater than 90% while substantially filtering out wavelengths outside the thermal infrared wavelength range, e.g., below 1.5 microns, where an opacity of the filter can depend in part on a coating applied to the filter. Replaceable filter 116 can be composed of a variety of materials, for example, single-crystalline germanium, chalcogenides, silicon and the like. Additionally, the thermal filter can include a diamond particle coating or another similar hardened coating on a surface of the thermal filter that is exposed to potential environmental damage.

Replaceable filter 116 can be configured to be a protective layer between the sensor device 106 and environmental damage, e.g., to protect a lens module or other optics. Environmental damage can include, for example, an accumulation of dust, collision with airborne debris, inclement weather such as ice/hail, thermal shock from extreme temperature changes, or the like. In some implementations, replaceable filter 116 can reduce damage induced by particular wavelengths of light, e.g., UV wavelengths, on optics and other components of the sensor device 106.

In some implementations, a thermal imaging system 115 includes a sensor device 106, e.g., a thermal imaging sensor, a lens module, a filter fixture, and the replaceable filter 116. Details of the components of the thermal imaging system 115 are described with reference to FIGS. 2A-C.

Navigation system 104 includes a camera control unit 122. Camera control unit 122 can be an onboard computer system on the autonomous vehicle 102, hosted on a cloud-based server, or a combination thereof. The camera control unit 122 includes a camera calibration module 124, an image quality monitor 126, and an alert generator 128. Though described here as a camera calibration module 124, an image quality monitor 126, and an alert generator 128, the operations described can be performed by more or fewer modules.

Camera calibration module 124 can include one or more camera calibrations that the thermal imaging system 115 can utilize to detect and identify objects of interest in the environment 107 surrounding the autonomous vehicle 102. For example, the camera calibration may define boundaries of objects of interest, e.g., sizes of human objects, and can include size/position/movement estimations for objects of interest that depend in part on a location of the thermal imaging system 115 relative to the autonomous vehicle 102, e.g., a sensor device 106 on the roof 110 of the autonomous vehicle 102 will have a different calibration than a sensor device 106 on the front bumper.

In some implementations, a camera calibration is a geometric camera calibration where a mapping is computed from pixel positions of an object in an image to the object in the three-dimension (3D) world, e.g., an intrinsic camera calibration, where the set of parameters of the calibration depend only on the camera properties.

In some implementations, the camera calibration is an extrinsic camera calibration, where a position of the camera is determined with respect to an external reference system, e.g., features in the environment 107 surrounding the autonomous vehicle 102.

In some implementations, the camera calibration is a thermal calibration where pixel values of the camera are mapped to actual temperatures of the environment 107. A thermal calibration can be used, for example, when the thermal imaging system 115 is used for thermography.

A camera calibration for a particular thermal imaging system can be determined during an installation process for the particular thermal imaging system 115, where a calibration can be fixed for the particular thermal imaging system throughout a period of operation of the thermal imaging system 115.

Image quality monitor 126 utilizes the camera calibration from the camera calibration module and thermal imaging data 130 provided by the thermal imaging system 115 and determines, e.g., using the calibration (e.g., detection model), that a quality of the imaging data is below a threshold imaging quality.

In some implementations, an imaging quality includes, determining edge issues (e.g., pixels that are constantly reading dark), unmoving objects though the autonomous vehicle is moving, lack of clarity of boundaries on objects of interest, etc.

Alert generator 128 receives a determination that the image quality is below a threshold image quality and can trigger one or more maintenance requests 132a, 132b. A maintenance request 132a can be, for example, instructions to an onboard cleaning system 134 to perform maintenance of the filter, e.g., spraying water on filter using the onboard cleaning system 134. A maintenance request 132b can be, in another example, a replacement notification provided to a user device 136, e.g., a maintenance order to an operator or to a user of the autonomous vehicle 102.

In some implementations, the onboard cleaning system 134 includes a rinsing apparatus mounted on the autonomous vehicle 102 and configured to spray a surface of the replaceable filter 116 with a cleaning liquid. The onboard cleaning system 134 can receive instructions from the camera control unit 122 to perform a cleaning cycle on the replaceable filter 116. A cleaning cycle can include, for example, spraying the replaceable filter 116 with a cleaning fluid, e.g., water, windshield cleaner, a solvent solution, etc. The cleaning cycle can additionally or alternatively include blowing compressed air, e.g., clean dry air or nitrogen, over the exposed surface of the replaceable filter 116.

The camera control unit 122 can receive confirmation of the performed cleaning cycle from the onboard cleaning system 134 and collect updated thermal imaging data 130 to verify any remaining issues with the imaging quality.

In some implementations, the alert generator 128 can determine that a cleaning cycle performed by the onboard cleaning system 134 was insufficient to improve the imaging quality above the threshold imaging quality and output, to a user device 136, a maintenance request.

User device 136 can be, for example, a mobile device, computer, laptop, tablet, or other device through which a user can receive a maintenance request through an application environment from the camera control unit. In some implementations, a maintenance request 132b is provided to a user device 136 as a text/SMS, email, phone call, or a similar form of alert notification.

A user of the user device 136 may be, for example, a maintenance technician for the autonomous vehicle. In some implementations, the user is an owner and/or operator of the autonomous vehicle 102. Further details related to the maintenance of the thermal imaging system is described below with reference to FIG. 3.

Figure 2A:
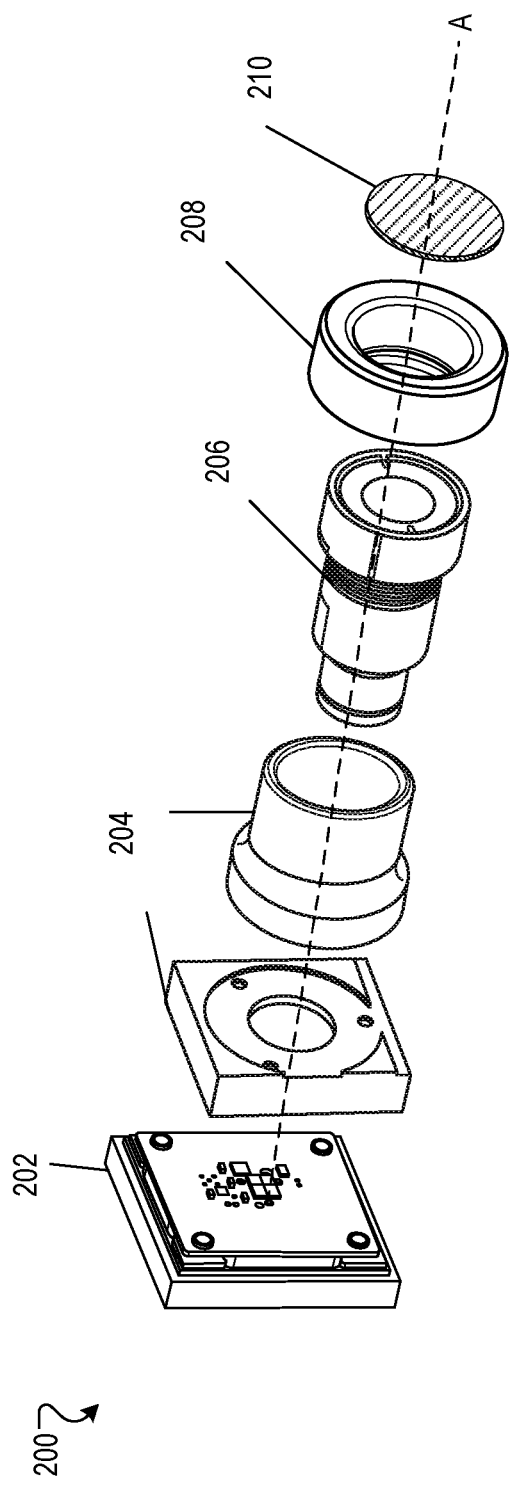
FIGS. 2A-C are block diagrams of example optical assemblies for the thermal imaging camera system.
Figure 2B:
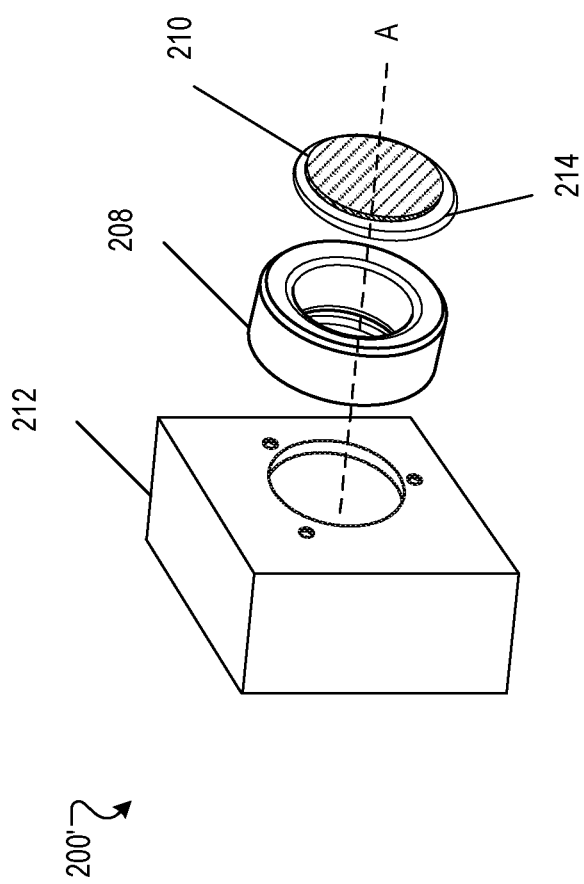
Figure 2C:
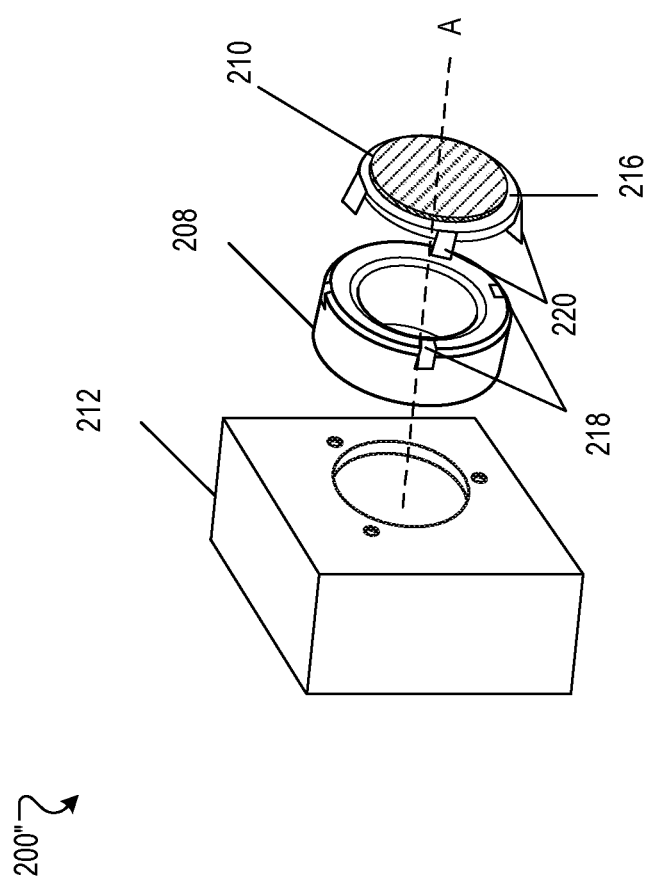

FIGS. 2A-C are block diagrams of example optical assemblies 200, 200', 200" for a thermal imaging camera system. In some implementations, as depicted in FIG. 2A, an optical assembly 200 for a thermal imaging system on an autonomous vehicle, e.g., thermal imaging system 115 on autonomous vehicle 102, includes a thermal imaging sensor 202, one or more spacers or receptacles 204 for mounting a lens module, and a lens module 206. The thermal imaging sensor 202 can be selected based in part on a wavelength range of interest to image. Example thermal imaging sensors 202 are based on micro-bolometers or other long wavelength infrared (LWIR) sensors.

The lens module 206 can be selected to collect imaging data at a particular focal plane, e.g., a distance that is 50 feet in front of the autonomous vehicle 102. The lens module 206 can be a wide-angle lens to capture a field of view including a large arc surrounding the autonomous vehicle 102. The lens module 206 is mounted with respect to the thermal imaging sensor 202 by the one or more spacers/receptacles 204 and aligned with respect to an optical axis A of the thermal imaging sensor 202 and configured to focus thermal infrared light on an imaging plane of the thermal imaging sensor 202.

Optical assembly 200 additionally includes a filter fixture 208 and replaceable filter 210, e.g., replaceable filter 116. The replaceable filter 210 may be mounted and held fixed by the filter fixture 208, e.g., a compression fit, semi-permanent adhesive, set screws, or the like, aligned with the optical axis A of the thermal imaging sensor 202.

In some implementations, replaceable filter 210 and the filter fixture 208 are configured such that the replaceable filter 210 can be removed and replaced, e.g., with a new replaceable filter 210, in a process that does not involve re-calibrating the thermal imaging sensor 202. As described in detail with reference to FIGS. 2B and 2C, the replaceable filter 210 can be mounted in a filter mount that can be removed/affixed to the filter fixture 208 without requiring additional maintenance, e.g., recalibration, of the thermal imaging system.

In some implementations, as depicted in FIG. 2B, an optical assembly 200' of a thermal imaging system 115 on an autonomous vehicle 102 utilizes a pre-packaged, e.g., off the shelf, thermal imaging camera 212, where a filter fixture 208 can be affixed to the thermal imaging camera 212 as a mount for the replaceable filter 210. As depicted in FIG. 2B, the replaceable filter 210 is affixed, e.g., using compression, set screws, or adhesive, to a threaded filter mount 214. The filter fixture 208 can be a threaded barrel mount, where the threaded filter mount 214 is configured to be threaded into the filter fixture 208 to hold the replaceable filter 210 in the filter fixture 208 and aligned with an optical axis A of the thermal imaging camera 212.

In some implementations, as depicted in FIG. 2C, the optical assembly 200" includes a replaceable filter 210 that is affixed, e.g., using compression, set screws, or adhesive, to a clip filter mount 216. The filter fixture 208 can include a set of clip receptacles 218, e.g., divots in a barrel mount, where clips 220 of the clip filter mount 216 can be securely fastened such that the clip filter mount 216 is affixed to the filter fixture 208, and the replaceable filter 210 is aligned with the optical axis A of the thermal imaging camera 212. Though depicted in FIG. 2C as a set of clips 220, e.g., tabs, that align with a set of receptacles 218 on the filter fixture 208, other configurations of compression-based and/or spring-loaded mounts can be used.

Example Operation of the Autonomous Vehicle Navigation Maintenance System

Figure 3:
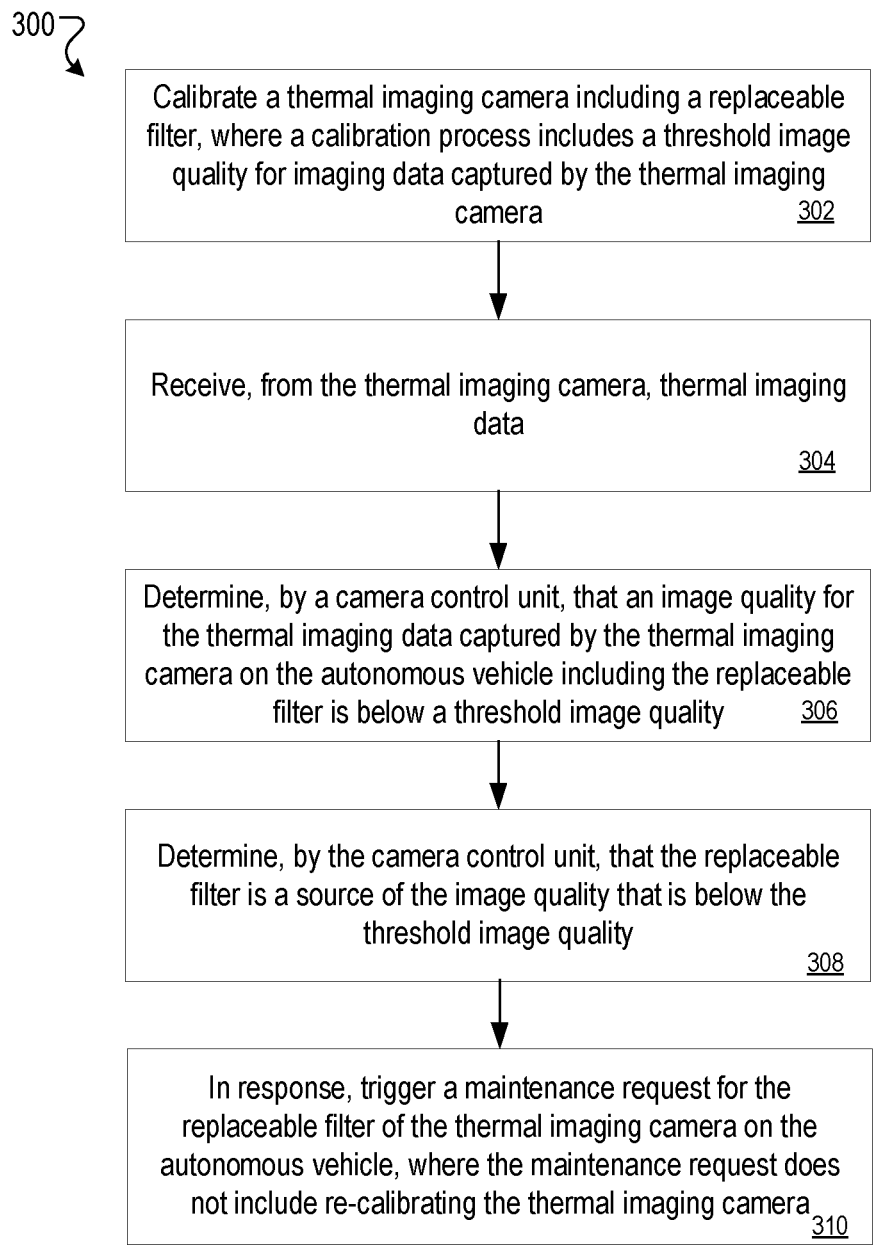
FIG. 3 is a flow diagram of an example process for maintaining a thermal imaging camera system on an autonomous vehicle.

FIG. 3 is a flow diagram of an example process 300 for maintaining a thermal imaging camera system on an autonomous vehicle. A thermal imaging camera is calibrated to include a replaceable filter, where a calibration process includes a threshold image quality for imaging data captured by the thermal imaging camera (302). As described above with reference to FIG. 1, a sensor device 106 can be a thermal imaging camera that is a part of a thermal imaging system 115 including a replaceable filter 116, where a calibration can be determined for the thermal imaging camera including the replaceable filter. The calibration for the camera can be established when the thermal imaging camera is installed on the autonomous vehicle 102, and can include, for example, a machine-learned model for detecting and identifying objects of interest, e.g., human targets, in the thermal imaging data 130 collected by the thermal imaging camera. The calibration includes a threshold image quality, e.g., a minimum quality of the thermal imaging data 130 deemed allowable.

Thermal imaging data is received from the thermal imaging camera (304). Thermal imaging data 130 can be collected by the thermal imaging camera 106 as the autonomous vehicle 102 is operating, e.g., driving along roadways, for a period of time and provided to the camera control unit 122, e.g., located on an onboard computer and/or cloud-based server. For example, thermal imaging data 130 can be collected for a period of 2 hours, 1 day, 1 week, or the like. The thermal imaging data 130 can be processed in real-time to detect objects of interest and/or provide information about the environment 107 surrounding the autonomous vehicle 102.

An image quality for the thermal imaging data captured by the thermal imaging camera on the autonomous vehicle including the replaceable filter is determined to be below a threshold image quality (306). An image quality monitor 126 of the camera control unit 122 can receive the thermal imaging data 130 from the thermal imaging camera and apply one or more quality metrics to determine that the thermal imaging data 130 is below a threshold image quality. In some implementations, quality metrics can be applied to the thermal imaging data to determine, for example, that thermal images collected are always dark in a corner regardless of movement of the autonomous vehicle 102, if thermal images collected are always blurred and never return sharp edges, if thermal images collected do not return detectable features in consistent regions of the images, or the like. Algorithms including image saliency detection algorithms can be used to determine if the thermal imaging data meets a set of quality metrics.

The replaceable filter for the thermal imaging system is determined to be the source of the imaging quality that is below the threshold imaging quality (308). A source of degradation of the image quality can be determined, based in part on one or more types of degradation observed, e.g., unmoving dark spots in the images, blurred lines, lack of defined edges, etc.

In response, a maintenance request is triggered for the replaceable filter of the thermal imaging camera on the autonomous vehicle, where the maintenance request does not include re-calibrating the thermal imaging camera (310). In some implementations, the maintenance request, e.g., maintenance request 132a, comprises rinsing a surface of the replaceable filter 116 with a cleaning liquid or compressed gas source from an onboard cleaning system 134. The maintenance request 132a and subsequent maintenance performed by the onboard cleaning system 134 can be performed autonomously without a user-provided interaction. In some implementations, the maintenance request 132a can be provided periodically to trigger regular cleaning of the replaceable filter 116 in addition to be in response to an observed degradation of image quality.

In some implementations, the image quality is determined to be below the threshold image quality after a completion of the maintenance request 132a and in response, triggers a second maintenance request 132b, e.g., a replacement notification. The replacement notification can be an alert to replace the replaceable filter 116 that does not include instructions to re-calibrate the thermal infrared camera. In some implementations, a replacement notification is provided to a user device, e.g., user device 136, where a user of the user device can receive the replacement notification and perform the required maintenance. In some implementations, the replacement notification is provided to an autonomous maintenance system, where a robotic and/or automated system may perform the required maintenance to replace the replaceable filter.

In some implementations, in response to the replacement notification, the replaceable filter 116 is removed and a new replaceable filter 116 is installed. The replacement of the replaceable filter 116 can include removing the damaged filter 116, e.g., by unthreading the threaded filter mount 214 holding the replaceable filter 210 from a barrel mount filter fixture 208 as depicted in FIG. 2B, or by un-clipping the clip filter mount 216 holding the replaceable filter 210 from the filter fixture 208 as depicted in FIG. 2C. A new replaceable filter 210 can be installed using an inverse process.

In some implementations, replacing the replaceable filter does not include a re-calibration step. Instead, a same camera calibration that was determined in step (302) is utilized to collect thermal imaging data after the new replaceable filter is installed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a user computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An autonomous vehicle monitoring system comprising:
a mounting surface located on an autonomous vehicle;
a thermal imaging system affixed to the mounting surface, the thermal imaging system comprising:
   a thermal imaging camera;
   a replaceable filter; and
   a filter fixture configured to affix the replaceable filter to the thermal imaging camera and aligned with an optical axis of the thermal imaging camera; and
a camera control unit configured to maintain an image quality for thermal imaging data collected by the thermal imaging system, wherein maintaining the image quality comprises:
   calibrating the thermal imaging camera affixed with a first replaceable filter, wherein the calibrating includes a threshold image quality for thermal imaging data captured by the thermal imaging camera;
   receiving, from the thermal imaging camera, thermal imaging data;
   determining, by the camera control unit, that an image quality for thermal imaging data captured by the thermal imaging camera affixed with the replaceable filter is below the threshold image quality;
   determining, by the camera control unit, that the replaceable filter affixed to the thermal imaging camera is a source of the image quality that is below the threshold image quality and in response, triggering a replacement notification for the replaceable filter affixed to the thermal imaging camera, wherein the replacement notification includes instructions to replace the replaceable filter and does not include instructions to re-calibrate the thermal imaging camera; and
   determining, by the camera control unit, that the image quality for thermal imaging data collected by the thermal imaging system is above the threshold image quality after a completion of the replacement notification.

2. The system of claim 1, wherein the thermal imaging camera comprises a thermal imaging sensor and an imaging lens aligned with the thermal imaging sensor and configured to focus infrared light on an imaging plane of the thermal imaging sensor.

3. The system of claim 1, further comprising a rinsing apparatus mounted on the autonomous vehicle and configured to spray a surface of the replaceable filter with a cleaning liquid.

4. The system of claim 1, wherein the replaceable filter comprises a single-crystalline germanium material.

5. The system of claim 4, wherein the replaceable filter is coated on a surface with diamond particles.

6. The system of claim 1, wherein the thermal imaging camera is configured to capture imaging data in a 7-14 micron wavelength range.

7. The system of claim 6, wherein the replaceable filter is configured to allow 90% or more of light having wavelengths in a thermal infrared wavelength range to pass through while filtering wavelengths outside the thermal infrared wavelength range.

8. The system of claim 7, wherein the thermal infrared wavelength range is 7 to 14 microns.

9. The system of claim 1, wherein the filter fixture is a threaded barrel mount.

10. The system of claim 1, wherein the replaceable filter is affixed to the filter fixture by a clip filter mount or threaded filter mount.

11. The system of claim 1, wherein replacing the replaceable filter comprises removing the replaceable filter affixed by the filter fixture to the thermal imaging camera and attaching a new replaceable filter to the thermal imaging camera using the filter fixture.

12. The system of claim 1, wherein the first replaceable filter is the replaceable filter.

13. A method for maintaining an image quality for thermal imaging data captured by a thermal imaging camera on an autonomous vehicle, the method comprising:
  calibrating the thermal imaging camera affixed with a first replaceable filter, wherein the calibrating includes a threshold image quality for thermal imaging data captured by the thermal imaging camera;
  receiving, from the thermal imaging camera, thermal imaging data;
  determining, by a camera control unit, that an image quality for thermal imaging data captured by the thermal imaging camera affixed with a replaceable filter is below the threshold image quality;
  determining, by the camera control unit, that the replaceable filter affixed to the thermal imaging camera is a source of the image quality that is below the threshold image quality and in response, triggering a replacement notification for the replaceable filter affixed to the thermal imaging camera, wherein the replacement notification includes instructions to replace the replaceable filter and does not include instructions to re-calibrate the thermal imaging camera; and
  determining, by the camera control unit, that the image quality for thermal imaging data captured by the thermal imaging camera is above the threshold image quality after a completion of the replacement notification.

14. The method of claim 13, wherein determining that the replaceable filter affixed to the thermal imaging camera is a source of the image quality that is below the threshold image quality comprises:
  determining that the image quality is below the threshold image quality after a completion of a maintenance request for the replaceable filter affixed to the thermal imaging camera, wherein the maintenance request does not include instructions to re-calibrate the thermal imaging camera.

15. The method of claim 14, wherein the maintenance request includes instructions to rinse a surface of the replaceable filter with a cleaning liquid.

16. The method of claim 13, wherein the first replaceable filter is the replaceable filter.

17. The method of claim 13, wherein the replacement notification is provided to a user device.

18. The method of claim 13, wherein the replacement notification is provided to an autonomous maintenance system.

19. The method of claim 13, wherein determining that the image quality is below the threshold image quality comprises applying one or more quality metrics to the thermal imaging data captured by the thermal imaging camera.

* * * * *